UNITED STATES PATENT OFFICE.

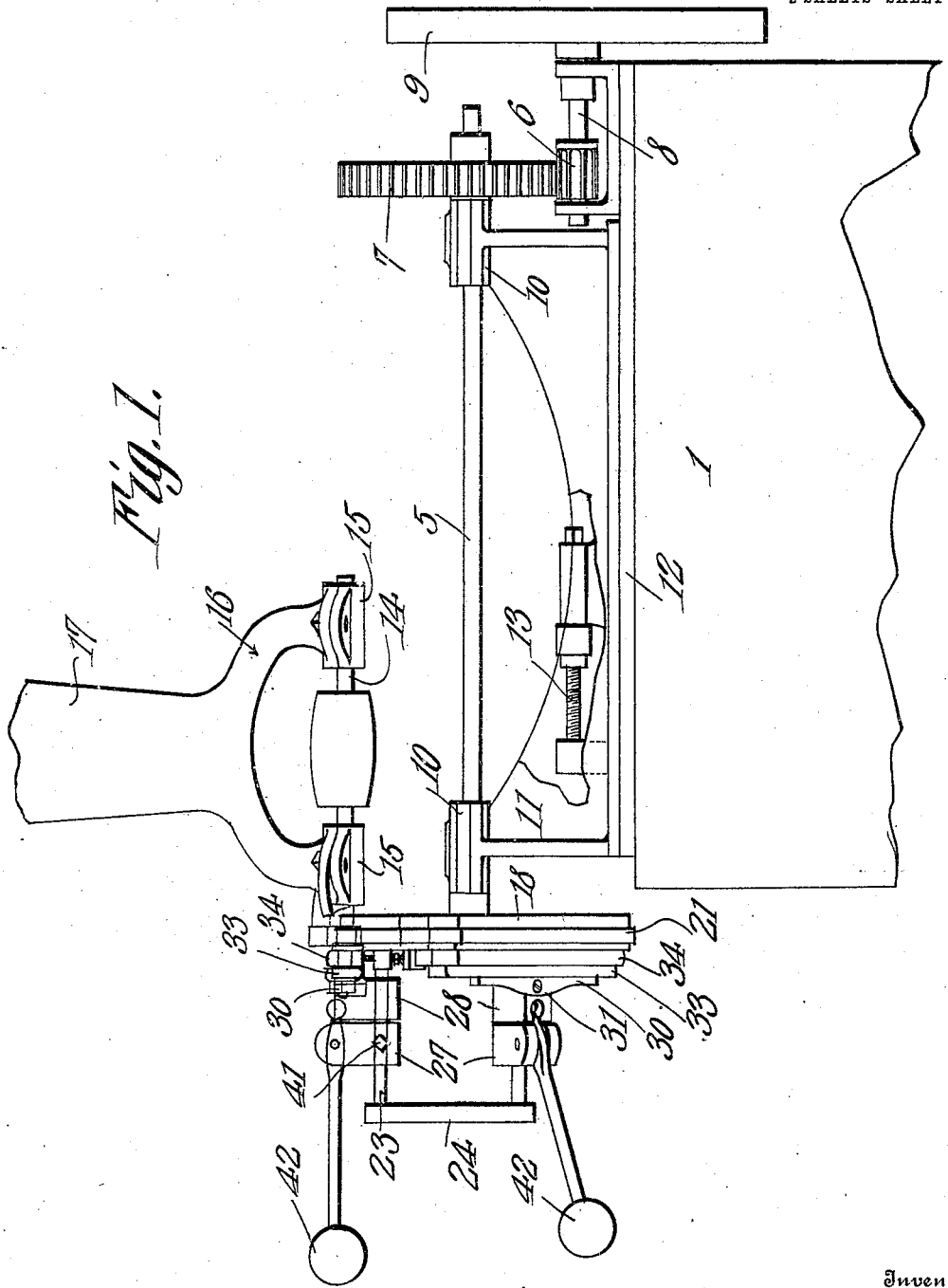

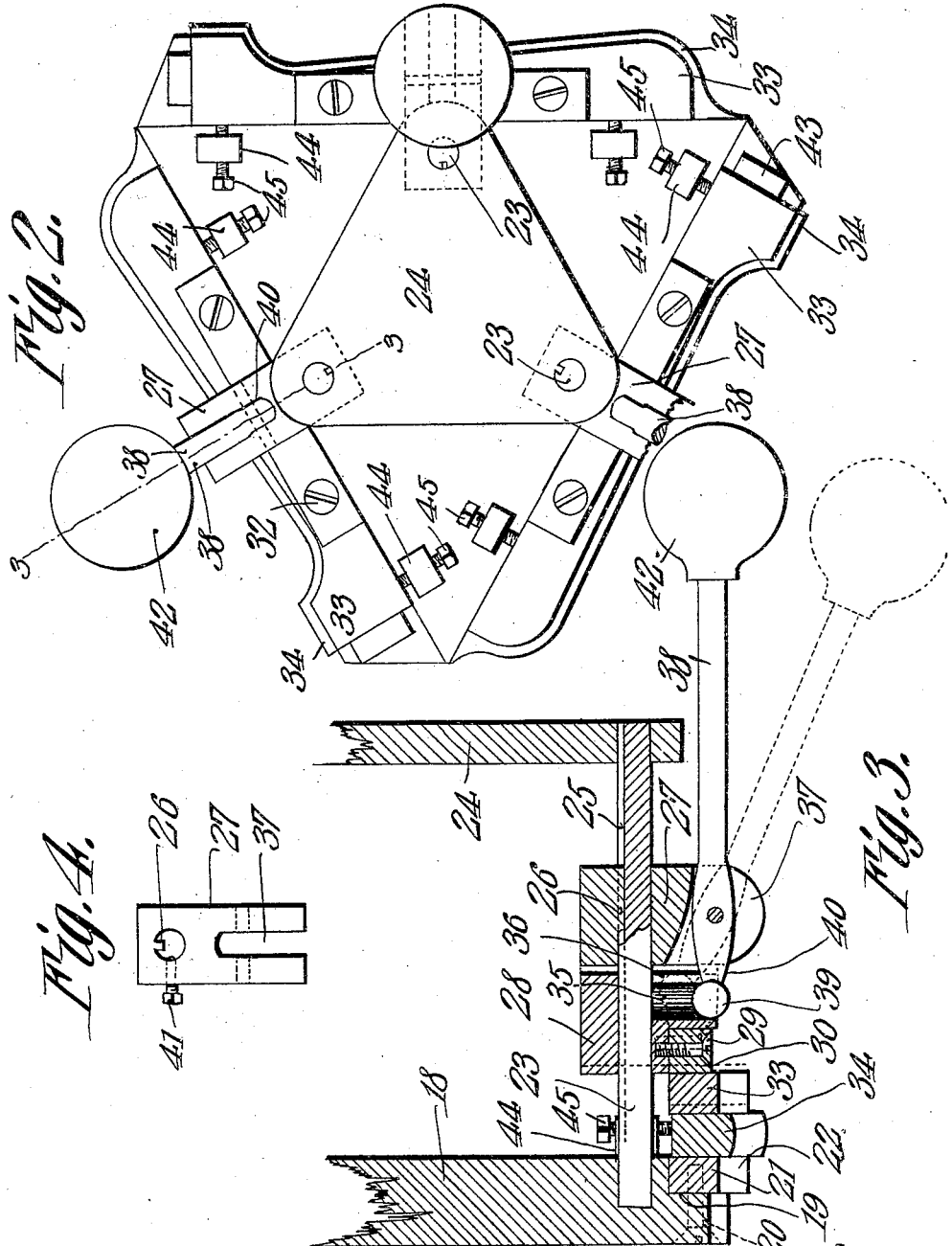

GRANT M. HALL, OF KEENE, NEW HAMPSHIRE.

MACHINE FOR SHAPING IRREGULAR FORMS.

934,437.  Specification of Letters Patent. Patented Sept. 21, 1909.

Application filed November 28, 1908. Serial No. 464,832.

*To all whom it may concern:*

Be it known that I, GRANT M. HALL, a citizen of the United States, residing at Keene in the county of Cheshire and State of New Hampshire, have invented a new and useful Machine for Shaping Irregular Forms, of which the following is a specification.

It is the primary object of the present invention to provide in a shaping machine, a work holder so constructed that the blanks to be treated may be readily fed to the holder and tightly clamped in place and will yet be automatically released after they have been treated by the cutting mechanism.

The form of work holder illustrated in the drawings is such as would be employed in the manufacture of brush handles or the like, although it is to be understood that the principles of the invention may be embodied in a head adapted to hold blanks from which articles other than those mentioned are to be formed.

The holder embodied in the present invention includes, among other features, means whereby the jaws may be adjusted so as to grip blanks of various thicknesses and means whereby the blanks may be adjusted with respect to the pattern means for guiding the cutter.

In the accompanying drawings, Figure 1 is a front elevation of a shaping machine for turning irregular forms showing the present invention applied thereto, Fig. 2 is a view in end elevation of the work holder embodied in the invention, Fig. 3 is a vertical sectional view through the holder on the line 3—3 of Fig. 2, and Fig. 4 is a detail view of one of the work gripping jaws.

In Fig. 1 of the drawings, the work holder embodied in the invention is shown as employed in connection with an ordinary shaping machine, the holder being fixed upon one end of a shaft 5 through the medium of which it is rotated, this shaft being driven from a small pinion 6 which meshes with a large gear 7 upon its other end; the pinion 6 is carried by a shaft 8 driven by a cable or belt (not shown) trained over a pulley 9 thereon. The shaft 5 is journaled in suitable bearings 10 upon a frame 11, this frame being mounted for longitudinal adjustment upon a base 12 supported in any suitable manner and the adjustment being had by means of an adjusting screw 13 constructed and arranged as is ordinary in machines of this character. The drive shaft of the machine is indicated by the numeral 14 and is journaled in suitable bearings 15 formed at the ends of the arms of a yoke 16 and the lower end of an arm 17 which is suspended for rocking or swinging movement from the power shaft (not shown). The cutter head is illustrated in general in dotted lines in Fig. 1 and as it is of the ordinary type, need not be specifically described.

The work holder embodied in the invention is comprised in part of a head plate 18 which is rigid upon the shaft 5 and is designed to be slowly rotated with the shaft. This head plate 18 is, as shown in the present instance, substantially triangular in outline, and is provided in each of its sides and its outer face with a recess or seat 19 in which is fixed, by means of suitable set screws 20, a pattern section 21 the pattern foot guiding edge of which is indicated by the numeral 22. Projecting laterally at right angles from the outer face of the head plate 18 at a point substantially midway the ends of each side edge of the said plate is a stem or jaw supporting rod 23, the said rods being connected at their outer ends by means of a plate 24 and being held by this plate in substantially parallel relation one with respect to another. Each of the rods 23 is provided with a longitudinally extending groove 25 and slidably mounted upon each of the rods and held against rotation thereon by means of a rib 26 which projects into the groove 25, is a jaw block 27, there being also mounted upon each rod between the jaw block 27 thereon and the head plate 18, a block 28 provided with a seat 29 in which is pivoted a strip 30 having a convex outer face 31, it being understood that the strip may have a slight rocking movement transversely of the respective block 28, and that should pressure be brought to bear upon this block a blank against which the strip or a member connected therewith bears, will be evenly gripped throughout its entire extent which might not be the case with the strip 30 rigidly secured to the block 28. Screws 32 serve to detachably connect, to the inner side of each of these strips 30, a pattern section 33, which matches the section 21 and between which and the corresponding pattern section 21 is to be clamped the blanks to be turned, this blank being indicated in Fig. 3 of the drawings by the numeral 34.

Each of the blocks 28 is formed with a cylindrical bore 35 and in its outer face with a slot 36 which opens into the said bore and pivoted in a slot 37 formed in each of the blocks 27, is an arm 38 the inner end of which is provided with a ball head 39 which works in the cylindrical bore 35 of the corresponding block 28, the arm adjacent the head being flattened as at 40 so as to work freely in the slot 36. It will be understood that when any one of the arms 38 is rocked to the position shown in dotted lines in Fig. 3 of the drawings, the ball head 39 working in the cylindrical bore of the corresponding block 28 will act to pull the said block along the rod 23 in the direction of the block 27, this latter block being of course held rigidly in adjusted position upon the said rod. This adjustment of the block 27 is had by means of a set screw 41 threaded through the block and bearing against the stem 23. On the other hand, when the arm 38 is swung to full line position in the said Fig. 3, the block 28 will be shifted upon the rod 23 in a direction away from the corresponding block 27 and will result in the pattern section 33 approaching the section 21 so that a piece of work such as a blank disposed between the two sections will be firmly clamped thereby in position to be acted upon by the cutter head of the machine. As is clearly shown in the several figures of the drawings, and particularly in Figs. 2 and 3, each of the arms 38 is provided at its outer end with a weight 42 which, as the work holder rotates, tends to swing the arms to dotted line position shown in Fig. 3 of the drawings, as the arms reach a plane beneath the horizontal plane of the shaft 5 so that the blocks 28 are successively and automatically shifted in the direction of the blocks 27.

In order to adjustably support a blank to be treated, in the holder, there is provided upon the outer face of each pattern section 21 at one end thereof, a stop 43 and upon the corresponding face of the head plate 18 adjacent each side edge thereof are lugs 44 in which are arranged adjusting screws 45 the ends of which are adapted to be engaged by the blanks being worked, the blank being disposed with one longitudinal edge against the ends of these adjusting screws 45 and with one end against the lug or boss 43.

In operation, a blank is placed in position between a pair of the pattern sections 21 and 33 and the corresponding arm 38 is forced manually to the full line position shown in Fig. 3 of the drawings, thereby forcing the block 28 in the direction of the head plate 18 so as to clamp the blank between the two pattern sections. It will be understood of course that the work holder is being constantly rotated although slowly and that after the blank has been so disposed, rotation of the holder will bring the blank beneath the cutter head, pattern feet (not shown) associated with the head traveling over the pattern foot guiding edge 22 of the pattern section 21, and the corresponding edge of the section 33 govern the line of cut of the cutter head. The speed of rotation of the shaft is such that when the blank passes from beneath the cutter head, one edge of the face has been completely finished and as the next pattern sections 21 and 33 come before the operator, a second blank is inserted and the corresponding arm 38 properly rocked to clamp the said blank. As the arms 38 gradually pass through the lower path of the circle described thereby their weighted ends act automatically to drop to the dotted line position shown in Fig. 3 of the drawings, and this movement of the arms will serve to retract the corresponding jaw blocks 28 and release the finished blanks, the pattern sections 21 and 33 being brought before the operator in separated condition so as to readily receive the next blank to be treated.

What is claimed is:—

1. In mechanism of the class described, a work holder comprising a rotatable head having a fixed jaw thereon, a support projecting from the head, a block slidably mounted upon the support and carrying a jaw coöperating with the fixed jaw, said block being formed with a socket and with a slot opening into said socket, a second block adjustably mounted upon the support, and an arm pivoted to the last mentioned block and formed with a head working in the socket, said arm projecting through the said slot.

2. In mechanism of the class described, a work-holder comprising a rotatable head having a fixed jaw thereon, means removably securing said jaw in place, said jaw having a guide edge, a support projecting from the head, a block slidably mounted upon the support, a jaw removably secured upon the block and having a guiding edge, said jaw coöperating with the fixed jaw, said block being formed with a socket, and with a slot opening into said socket, a second block adjustably mounted upon the support, and an arm pivoted to the last mentioned block and formed with a head working in the socket, said arm projecting through said slot.

3. In mechanism of the class described a work-holder comprising a rotatable head having a fixed jaw thereon, means removably securing said jaw in place, said jaw having a guide edge, a support projecting from the head, a block slidably mounted upon the support, a jaw removably secured upon the block and having a guiding edge, said jaw coöperating with the fixed jaw, said block being formed with a socket and with a slot opening into said socket, a second block adjustably mounted upon the support, and an arm pivoted to the last mentioned block and formed with a head working in the socket, said arm projecting through said slot, said arm having its outer free end weighted.

4. In mechanism of the class described, a work-holder comprising a rotatable head having a fixed jaw thereon, a support projecting from the head, a block slidably mounted upon the support and carrying a jaw coöperating with the fixed jaw, lugs upon that face of the head from which the support projects, said lugs being located inwardly of the fixed jaw upon the head, adjustable stop screws threaded through the lugs, a stop lug upon the jaw adjacent one end thereof, a block slidably mounted upon the support and carrying a jaw coöperating with the fixed jaw, said block being formed with a socket and with a slot opening into said socket, a second block adjustably mounted upon the support, and an arm pivoted to the last mentioned block and formed with a head working in said socket, said arm projecting through said slot.

In testimony that I claim the foregoing as my own, I have hereto affixed my signature in the presence of two witnesses.

GRANT M. HALL.

Witnesses:
 GRACE M. HALL,
 CHARLES A. SMITH.